2,955,421
Patented Oct. 11, 1960

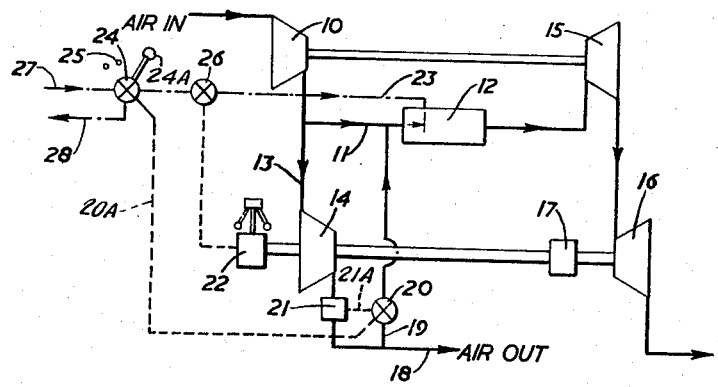

United States Patent Office

2,955,421
GAS TURBINE-DRIVEN PLANT

James Hodge, Farnborough, England, assignor to Power Jets (Research & Development) Limited, London, England, a British company Filed Mar. 2, 1956, Ser. No. 569,082

Claims priority, application Great Britain Mar. 17, 1955

4 Claims. (Cl. 60—39.16)

This invention relates to gas turbine-driven plant operable to produce a compressed gaseous output.

It has already been proposed to provide such plant which is capable of producing an output of variable mass flow at a pressure level above the maximum gas turbine cycle pressure. A control arrangement previously suggested for this apparatus ensures that a wide range of mass flow can be obtained, whilst the rotary components are maintained in a satisfactory operating condition and, in particularly, compression surge is avoided. However, that control arrangement succeeded in maintaining the plant in a running condition, when the output demand was reduced substantially to zero, only at the cost of a fuel consumption about 60% of that at full load demand. It is clearly desirable to provide a more economic idling arrangement.

According to the present invention there is provided gas turbine-driven plant operable to produce a compressed gaseous output at a pressure level above the maximum gas turbine cycle pressure and comprising a mechanism responsive to a reduction of output demand substantially to zero to override the normally-operative fuel supply governor control and to restrict the fuel input to a predetermined idling rate.

The arrangement of the plant may comprise low and high pressure air compression means, a combustion system fed from said low pressure air compression means, turbine means drivingly connected to said compression means and fed with working fluid from said combustion system, an output supply duct from said high pressure compression means, a governor arranged via a fuel valve to control the fuel input to the combustion system and drivingly interconnected with said high pressure compression means, a fuel throttle valve operable to override the governor-controlled valve and an interconnection between said mechanism and said throttle.

Embodiments of the present invention will now be described, by way of example only, with reference to the accompanying drawings in which:

The figure is a cycle diagram of a gas turbine-driven air compressing plant with fuel input thereto subject to governor and output demand control.

The plant shown in the figure is an air compressing plant arranged for cross compounded gas turbine drive. A low pressure compressor 10 receives air and after compressing it, feeds it in two streams, one via the duct 11 to a combustion chamber 12 and the other via a duct 13 to a high pressure compressor 14. The two compressors are respectively driven by turbines 15 and 16, which are supplied in series with hot gases from the combustion chamber 12. The turbine 16 drives the compressor 14 through a gear train 17. The output of the high pressure compressor 14 is delivered to the user via the outlet duct 18 and between this duct and duct 11 there is a by-pass 19 controlled by a valve 20 via a connection 21A. The latter is made responsive to a control device 21 which senses the operating condition of the high pressure compressor and is arranged to keep that condition surge-free. In normal operation, a governor 22 maintains substantially constant the rotational speed of the high pressure compressor 14 by exercising control over the fuel input through the pipe 23 to the combustion chamber 12.

In patent application Serial No. 490,372, now Patent No. 2,811,302, it is explained how reduction of flow through the outlet duct 18 results in the opening of valve 20, whilst the speed of the high pressure compressor 14 and its throughput are maintained. Whilst the control system deals satisfactorily with fluctuations in load which may be expected in normal use, it is uneconomic by itself if the plant is likely to be idling for any considerable time. The fuel consumption is dropped to about 60% of that at full load if the valve 20 is wide open; this cannot be allowed to persist for lengthy periods. As shown in the figure, the fuel idling arrangement comprises a valve 24 which controls the amount of fuel to be returned to a fuel tank (not shown in the drawing) via a spill line 28. The valve 24 is manually operable by a handle 24A and can be placed into a position 25 in which fuel is returned via the spill line 28. A mechanical connection 20A links the by-pass valve 20 and valve 24.

The operation of the fuel idling arrangement will now be described with reference to the drawing. A control device 21, on sensing compression surge due to a fall in output demand, opens the valve 20 and permits compressed air to pass via the by-pass pipe 19 to the combustion chamber 12. Movement of the valve 20 into an open position sets the valve 24 into the position 25 which permits fuel to pass via the spill line 28 to the fuel tank. The return of fuel to the tank reduces the fuel flow passing through fuel pipe 23 to the combustion chamber 12 and in view of the fact that the valve 24 is upstream of the governor control fuel valve 26, the fuel control effect of the latter valve is over-ridden. The reduction of fuel flow is chosen so that the plant as a whole remains self-driving and moreover so that a steady and rapid acceleration can be achieved without dangerous tendencies towards compressor surge or excessive temperature in the plant.

It should be understood that the idling control may be arranged to become effective even though the net output is never, in operation, reduced to zero, since there may be leaks in the air consuming equipment. It is adjusted to come into use at an output flow corresponding to the leakage.

What I claim is:

1. Gas turbine-driven plant comprising low pressure air compression means, high pressure air compression means connected in series flow with said low pressure air compression means, a combustion system connected in series flow with said low pressure compression means, and in parallel flow with said high pressure compression means, first turbine means drivingly connected to said low pressure air compression means, second turbine means drivingly connected to said high pressure air compression means, both of said turbine means being arranged to be supplied with working fluid from said combustion system, a compressed air outlet duct from said high pressure compression means, a duct connection between said low pressure compression means and said combustion system, an air flow by-pass from said outlet duct to said duct connection, a fuel supply system for said combustion system, a governor drivingly interconnected with said high pressure compression means, a mechanism responsive to air flow to output through said outlet duct, a first valve in said fuel system controlled by said governor and a second valve in said fuel system controlled by said mechanism to override the effect of said first valve.

2. Gas turbine-driven plant as claimed in claim 1 and comprising a valve in said by-pass, means controlling the opening of said by-pass valve in accordance with flow conditions in said high pressure compression means, and a direct operating connection transmitting movements of said by-pass valve to said mechanism.

3. Gas turbine-driven plant as claimed in claim 1 and comprising means for monitoring the air flow through said outlet duct, and an interconnection between said mechanism and said monitoring means.

4. Gas turbine-driven pant as claimed in claim 1 and comprising a fuel spill conduit connected to said second valve, the latter and said mechanism being so interconnected that reduction of the air flow to output through said duct substantially to zero effects a predetermined fuel spill increase.

References Cited in the file of this patent

UNITED STATES PATENTS

| | | |
|---|---|---|
| 1,280,811 | Moss | Oct. 8, 1918 |
| 2,743,051 | Grey | Apr. 24, 1956 |

FOREIGN PATENTS

| | | |
|---|---|---|
| 627,783 | Great Britain | Aug. 16, 1949 |